US011232623B2

(12) United States Patent
Laflamme

(10) Patent No.: US 11,232,623 B2
(45) Date of Patent: Jan. 25, 2022

(54) METHOD AND SYSTEM FOR CREATING A NEURAL NET BASED LOSSY RENDERER

(71) Applicant: Unity IPR ApS, Copenhagen (DK)

(72) Inventor: Dominic Laflamme, Hudson (CA)

(73) Assignee: Unity IPR ApS, Copenhagen (DK)

( * ) Notice: Subject to any disclaimer, the term of this patent is extended or adjusted under 35 U.S.C. 154(b) by 18 days.

(21) Appl. No.: 16/946,574

(22) Filed: Jun. 26, 2020

(65) Prior Publication Data

US 2020/0410741 A1 Dec. 31, 2020

Related U.S. Application Data

(60) Provisional application No. 62/868,526, filed on Jun. 28, 2019.

(51) Int. Cl.
*A63F 13/5258* (2014.01)
*G06T 15/00* (2011.01)
*G06T 3/40* (2006.01)

(52) U.S. Cl.
CPC ........ *G06T 15/005* (2013.01); *A63F 13/5258* (2014.09); *G06T 3/4046* (2013.01); *A63F 2300/6684* (2013.01); *G06T 2200/04* (2013.01)

(58) Field of Classification Search
CPC . G06T 15/005; G06T 3/4046; G06T 2200/04; A63F 13/5258; A63F 2300/6684; A63F 3/4053
See application file for complete search history.

(56) References Cited

U.S. PATENT DOCUMENTS

| | | | | |
|---|---|---|---|---|
| 5,596,687 A | * | 1/1997 | Peters, Jr. | G06T 3/4007 345/564 |
| 6,304,268 B1 | * | 10/2001 | Iourcha | G06T 3/4007 345/428 |
| 9,495,783 B1 | * | 11/2016 | Samarasekera | H04N 5/2258 |
| 10,460,500 B1 | * | 10/2019 | Hunt | G06T 15/005 |
| 2005/0024376 A1 | * | 2/2005 | Gettman | G06F 16/954 345/582 |

* cited by examiner

*Primary Examiner* — Said Broome
(74) *Attorney, Agent, or Firm* — Schwegman Lundberg & Woessner, P.A.

(57) ABSTRACT

A method of generating a high-resolution image frame for a state of a video game within a 2D or 3D environment is disclosed. A low-resolution data map of a virtual camera frustum view of the 2D or 3D environment for the state is determined. The data map is of a data type. A high-resolution output data map of the data type is generated from the low-resolution data map. The generating of the high-resolution output data map includes training a neural network. The training includes associating a low-resolution data map of the data type with a high-resolution data map of the data type within the 2D or 3D environment. A high-resolution image of the frustum view is generated from the high-resolution output data map. The generated high-resolution image is displayed on a display device.

20 Claims, 9 Drawing Sheets

METHOD AND SYSTEM FOR CREATING A NEURAL NET BASED LOSSY RENDERER

CROSS-REFERENCE TO RELATED APPLICATIONS

This application claims the benefit of U.S. Provisional Application No. 62/868,526, filed Jun. 28, 2019, which is incorporated by reference herein in its entirety.

TECHNICAL FIELD

The subject matter disclosed herein generally relates to the technical field of computer systems and, more specifically, to computer systems and methods for rendering high-resolution images for use in game and simulation systems.

BACKGROUND OF THE INVENTION

In the world of games, simulations and real-time rendering, current rendering technology uses a plurality (e.g., many millions) of triangles and associated shader programs to render a fixed amount of pixels on a screen. To increase realism and quality with existing technology, a game must either increase the amount of triangles or increase complexity of the shader programs. Both of those solutions occur at the expense of performance. The reduction in performance is especially true for devices that have limited compute and memory capacity, such as mobile devices. Furthermore, information on the triangles cannot be "compressed" in a way to sacrifice quality for performance, which is sometimes needed.

BRIEF DESCRIPTION OF THE DRAWINGS

Further features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
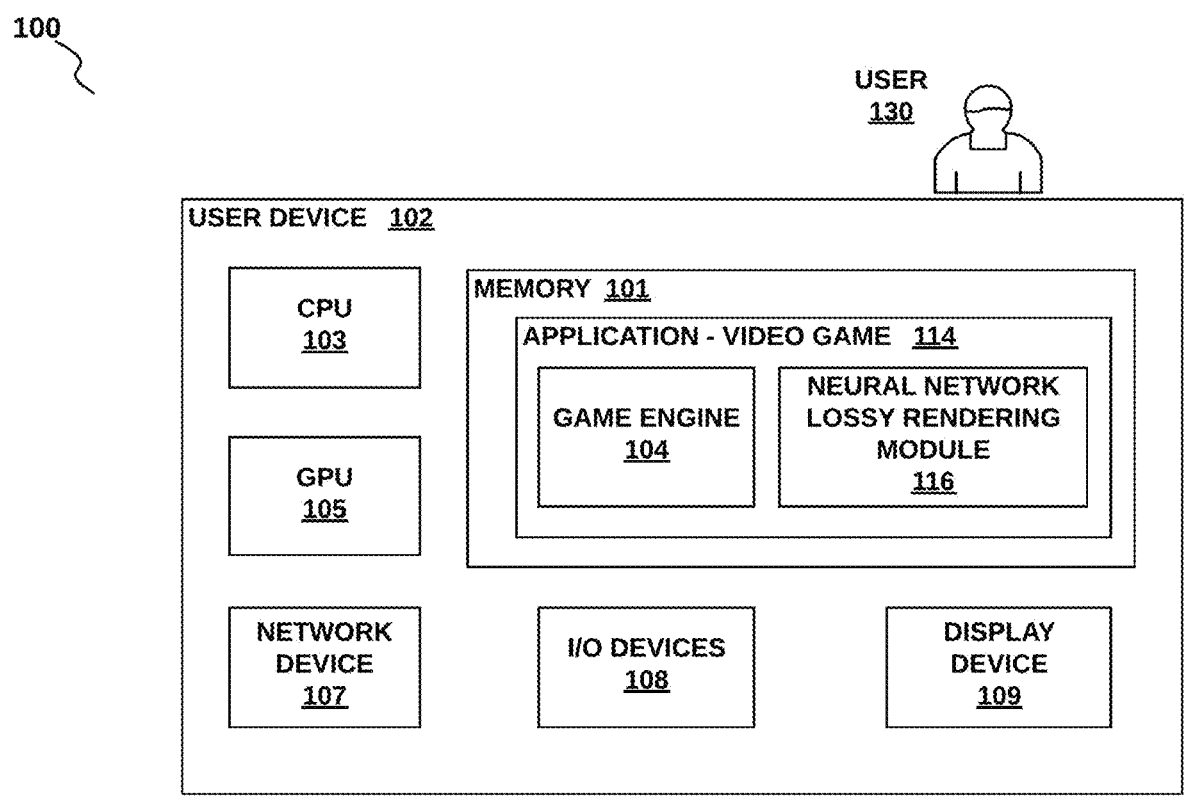
FIG. 1 is a schematic illustrating a user device within a neural network lossy rendering system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein is understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used herein is understood to include any digital object or digital element within an environment. A game object can represent (e.g., in a corresponding data structure) almost anything within the environment; including 3D models (e.g., characters, weapons, scene elements (e.g., buildings, trees, cars, treasures, and the like)), backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or played by an artificial intelligence agent.

Throughout the description herein, the term 'agent' and 'AI agent' should be understood to include entities such as a non-player character (NPC), a robot, and a game world which are controlled by an artificial intelligence system or model.

The terms 'client' and 'application client' used herein are understood to include a software client or software application that accesses data and services on a server, including accessing over a network.

A method of generating a high-resolution image frame for a state of a video game within a 2D or 3D environment is disclosed. A low-resolution data map of a virtual camera frustum view of the 2D or 3D environment for the state is determined. The data map is of a data type. A high-resolution output data map of the data type is generated from the low-resolution data map. The generating of the high-resolution output data map includes training a neural network. The training includes associating a low-resolution data map of the data type with a high-resolution data map of the data type within the 2D or 3D environment. A high-resolution image of the frustum view is generated from the high-resolution output data map. The generated high-resolution image is displayed on a display device.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Turning now to the drawings, systems and methods, including non-routine or unconventional components or operations, or combinations of such components or operations, for neural net based lossy rendering in accordance with embodiments of the invention are illustrated. In accordance with an embodiment, there is provided a system and method for rendering high-resolution visuals (e.g., video frame images) of a video game using a trained neural network with minimal processing power. Using the system and method, a high-resolution visual can be generated in real-time on a low-end device (e.g., a mobile phone with minimal processing power). Using the systems and methods described herein, the trained neural network learns to generate a high-definition image when provided with a lower-quality (e.g., lower resolution) input signal. In operation (e.g., in runtime on a user device and as described with respect to FIG. 3), an application (e.g., software application) such as a video game can generate simple low-resolution images and use the trained neural network (e.g., trained with the method 200 described with respect to FIG. 2A) to convert the low-resolution images into high-resolution versions in real-time.

In accordance with an embodiment, and shown in FIG. 1 is a neural network lossy rendering system 100. The neural network lossy rendering system 100 includes a user device 102. In accordance with an embodiment, the user device 102 includes one or more central processing units 103 (CPUs), and graphics processing units 105 (GPUs). The CPU 103 is any type of processor, processor assembly comprising multiple processing elements (not shown), having access to a memory 101 to retrieve instructions stored thereon, and execute such instructions. Upon execution of such instructions, the instructions implement the user device 102 to perform a series of tasks as described herein with respect to FIG. 2A, FIG. 2B, FIG. 3, and FIG. 5. In some embodiments, the user device 102 may be a computing device capable of providing a digital experience (e.g., a video displayed on a 2D screen) to a user 130. In some embodiments, the user device 102 may be a computing device capable of providing a mixed reality experience to a user 130. In some embodiments, the user device 102 is a head-mounted display (HMD) device worn by the user 130, such as an augmented reality (AR) or virtual reality (VR) visor (e.g., Google Glass®, HTC Vive®, Microsoft HoloLens®, and so forth). In other embodiments, the user device 102 is a computing device such as a desktop computer, or a mobile computing device, such as a smartphone or a tablet computer.

The user device 102 also includes one or more input/output devices 108 such as, for example, a keyboard or keypad, mouse, pointing device, a touchscreen, a microphone, a camera, a hand-held device (e.g., hand motion tracking system), and the like, for inputting information in the form of a data signal readable by the processing device. The user device 102 further includes one or more display devices 109, such as a computer monitor or touchscreen of a tablet or smartphone, and a head mounted display (HMD), which may be configured to display digital content including video, a video game environment, an integrated development environment and a virtual simulation environment to the user 130. The display device 109 may include lenses or a visor of a VR or AR HMD, which may be configured to display virtual objects to the user 130 in conjunction with a real world view. The display device 109 is driven or controlled by the one or more GPUs 105 and optionally the CPU 103. The GPU 105 processes aspects of graphical output that assists in speeding up rendering of output through the display device 109. The user device 102 also includes one or more networking devices 107 (e.g., wired or wireless network adapters) for communicating across a network.

In accordance with an embodiment, the memory 101 can be any type of memory device, such as random access memory, read only or rewritable memory, internal processor caches, and the like. The memory 101 in the user device 102 can be configured to store an application 114 (e.g., a video game, a simulation, or other software application) which can include a game engine 104 (e.g., executed by the CPU 103 or GPU 105) that communicates with the display device 109 and also with other hardware such as the input device(s) 108 to present the application to the user 130. The game engine 104 may include one or more modules that provide the following: animation physics for game objects, collision detection for game objects, rendering, networking, sound, animation, and the like in order to provide the user with an application environment (e.g., video game or simulation environment). The application 114 includes a neural network lossy rendering module 116 that provides various neural network lossy rendering system functionality as described herein (e.g., as described with respect to FIG. 2A, FIG. 2B, FIG. 3 and FIG. 5). Each of the game engine 104, the application 114, and the neural network lossy renderer 116 includes computer-executable instructions residing in the memory 101 that are executed by the CPU 103 and optionally with the GPU 105 during operation. The game engine 104 includes computer-executable instructions residing in the memory 101 that are executed by the CPU 103 and optionally with the GPU 105 during operation in order to create a runtime program such as a game engine. The application 114 includes computer-executable instructions residing in the memory 101 that are executed by the CPU 103 and optionally with the GPU 105 during operation in order to create a runtime application program such as a video game. The game engine 104 and the neural network lossy renderer 116 may be integrated directly within the application 114, or may be implemented as external pieces of software (e.g., plugins).

Figure 2A:
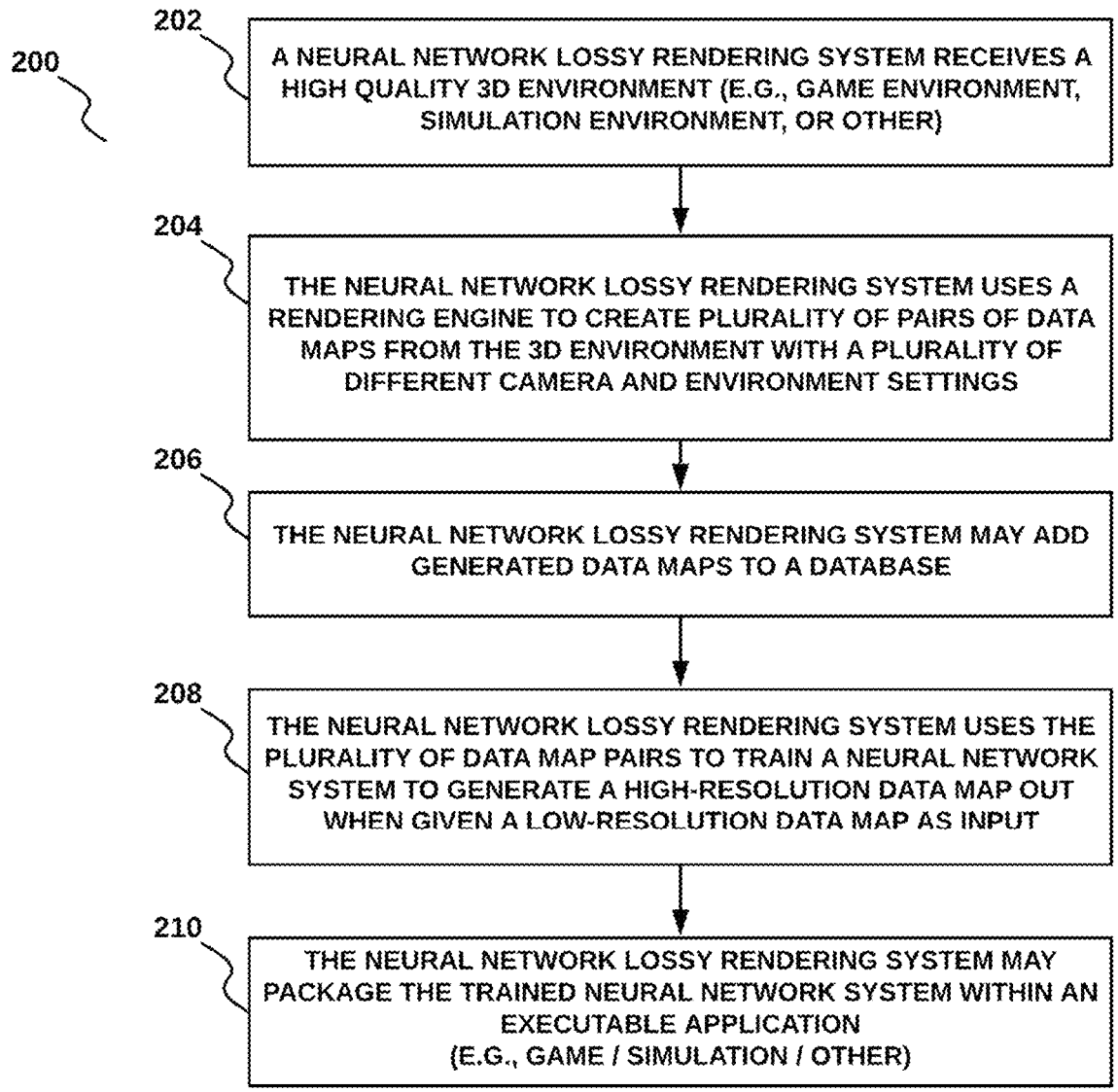
FIG. 2A is a schematic illustrating a method for training a neural network lossy rendering system, in accordance with one embodiment.

In accordance with an embodiment and shown in FIG. 2A is a method 200 for training a neural network for use in the neural network lossy renderer system 100. At operation 202 of the method 200, the neural network lossy rendering module 116 receives an environment for use in an application 114. The environment may be created by a user (e.g., artist, programmer, game developer, and the like). The application 114 may be a video game, simulation, or any other computer or mobile device application. The environment may be a 3D digital environment and includes data (e.g., including 3D model data, mesh data, texture data, lighting data, and the like) necessary to render and display the environment (e.g., on a user device). The environment includes game objects that may have any level of complexity with any number of mesh triangles and vertices, including any level of complexity with respect to shaders, lighting and image effects. The higher a complexity and realism of the environment received in operation 202, the higher the quality of the output from the neural network lossy rendering system 100 during operation. In accordance with an embodiment, the environment includes dynamic objects (e.g., objects which can move or transform) including characters, weapons, explosions and the like.

In accordance with an embodiment, at operation 204 of the method 200, the neural network lossy rendering module 116 creates a dataset of single-frame data maps of the environment. In accordance with an embodiment, a data map may be a 2-dimensional map of data such as an image, a data buffer, and the like which corresponds to a rendering of a virtual camera view (e.g., frustum view) within the environment. A data map can include the following types of data: an RGB image, a normal map, a depth map, a reflectivity map, a motion vector map, and any combination thereof. In accordance with an embodiment, operation 204 includes generating a plurality of pairs of data maps of the environment from various positions, orientations and conditions within the environment (e.g., via a plurality of virtual camera settings including camera position, camera orientation, and camera settings). The various positions, orientations and conditions may be determined at fixed intervals (e.g., fixed interval of positions throughout the environment, a fixed interval of orientations, and a fixed interval of conditions) or determined randomly, or otherwise. In accordance with an embodiment, as part of operation 204, a pair of data maps includes one high-resolution data map (e.g., a high-resolution RGB image) and one low-resolution data map of the same type of data (e.g., a low-resolution RGB image) taken with the same position, orientation and conditions. The low-resolution data map and the high-resolution data map are linked and represent the same 'view' (e.g., a same virtual camera frustum view) of the environment at different resolutions and with the same data type. For example, based on the data map type being an RGB image, the neural network lossy rendering module 116 would render a low-resolution RGB image and a high-resolution RGB image from the same view and with the same conditions within the environment (e.g., two RGB images of the same view of a clearing in a forest, or two RGB images of the same view of a tree, or two RGB images of the same view of part of a room, or the like). In accordance with an embodiment, as part of operation 204, the neural network lossy rendering module 116 can generate a pair of data maps in different data types from the same position, orientation and conditions within the environment. For example, with a position, an orientation and a set of conditions, the module 116 might generate a pair of data maps for each of the data types (e.g., one pair of RGB images, one pair of depth maps, one pair of reflectivity maps, and the like). The generation of data map pairs in different data types may be used (e.g., in operation 208) to train a separate neural network for each data type or to train a single neural network to recognize different data types. In accordance with an embodiment, a high-resolution data map may be generated using a high density of data points. For example, a high-resolution RGB image can be rendered using a renderer with settings consistent with producing a high quality image (e.g., high pixel density and high bit depth color). In accordance with an embodiment, a low-resolution data map may be generated using a low density of data points. For example, a low-resolution RGB image can be rendered using a renderer with settings consistent with producing a low quality image. For example, the low-resolution image could be a smaller version (e.g., fewer pixels) of the original image, or it could be a rendering using low quality shaders, or it could use fewer colors, or the like. In accordance with an embodiment, the low-resolution data map may be generated by downsampling an associated high-resolution data map. In accordance with an embodiment, operation 204 of the method 200 is carried out a plurality of times to generate a large dataset of pairs of data maps.

In accordance with an embodiment, at operation 206 of the method 200, the neural network lossy rendering module 116 may take the data maps generated during operation 204 and adds them to a memory (e.g., within a database). Operation 206 may be done by moving data map as it is generated, or the generated data maps may be put in a buffer and moved in batch mode.

In accordance with an embodiment, at operation 208 of the method 200, the neural network lossy rendering module 116 uses the plurality of pairs of data maps in the dataset to train a neural network to associate low-resolution data maps with high-resolution data maps of the same view of the environment such that the neural network learns to estimate a high-resolution data map when given a low-resolution data map. The training of the neural network in operation 208 can use any neural network training method. In accordance with an embodiment, a plurality of types of data can be used during operation 208. For example, operation 208 may use only RGB image data maps, or only reflectivity maps, or a combination of RGB and reflectivity data maps, or any other combination of data maps. In accordance with an embodiment, the type of neural network trained in operation 208 can include any type of neural network which can learn to estimate a high-resolution data map when given a low-resolution data map, including for example a generative adversarial network (GAN). In accordance with an embodiment, the neural network may include memory (e.g., a recurrent neural network, a long short-term memory (LSTM) neural network) which allows it to determine a temporal connection between successive inputs (e.g., between successive frames within a video game). The neural network memory can allow the neural network to be temporally stable from one frame to another (e.g., to generate consistent outputs for sequential input data map frames). After operation 208 has trained a neural network, the trained neural network may be capable of evaluating an unknown low-resolution data map from the same environment as an input and generate a high-resolution version of the unknown data map (e.g., with the unknown data map being a data map which is not part of the dataset created during operation 204). For example, the trained neural network may be given a new low pixel count image from within the environment (e.g., an image not part of the dataset created during operation 204) as an input and the trained neural network will output a high pixel count version of the image.

In accordance with an embodiment, at operation 210 of the method 200, the neural network lossy rendering module 116 may package the trained neural network within an executable application (e.g., the application 114 in FIG. 1). This includes creating at least one executable file and any associated libraries, DLL, or other necessary files for the application to function.

Figure 2B:
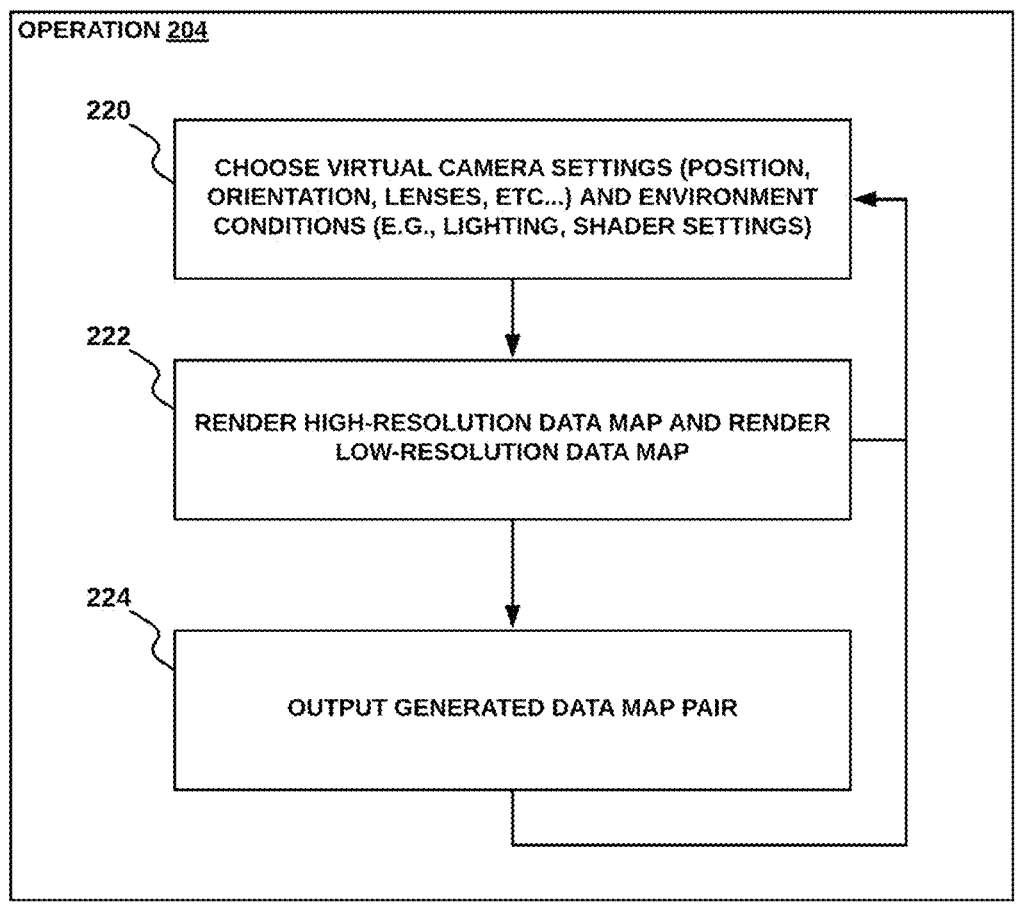
FIG. 2B is a schematic illustrating a method for generating a pair of data maps for a neural network lossy rendering system, in accordance with one embodiment.

In accordance with an embodiment, FIG. 2B shows some details of operations within operation 204. At operation 220, the neural network lossy rendering module 116 determines camera settings for a virtual camera within the environment. The camera settings may include a position of the camera, an orientation of the camera, and one or more optical settings (e.g., a type of camera lens, properties of a camera lens, frustum settings including culling planes, and the like). In accordance with an embodiment, as part of operation 220, the neural network lossy rendering module 116 determines environment conditions which may be associated with the camera settings. The environment conditions describe at least an area within the environment surrounding the virtual camera or within a view (e.g., a frustum view) of the camera. The environment conditions may include properties and settings for objects (e.g., including game objects) that affect the look of the environment (e.g., position and properties of light objects in the environment, position and properties of characters within the environment, position and properties of special effects within the environment, animation of objects within the environment) as well as properties and settings for rendering (e.g., shader settings). For example, the environment conditions may include the positioning and posing of characters in the environment along with weapons, explosions backgrounds and more. In accordance with an embodiment, at operation 222, the neural network lossy rendering module 116 uses a rendering engine (e.g., that includes a rendering pipeline) to render a high-resolution data map and a low-resolution data map. The rendering engine uses the camera settings and environment conditions as determined in operation 220 for the rendering of the high-resolution data map and the rendering of the low-resolution data map. In accordance with an embodiment, at operation 224, the neural network lossy rendering module 116 outputs the generated data map pair. The operation 204 then loops back to operation 220 where a new virtual camera setting and environment conditions are chosen. In accordance with an embodiment, the looping within operation 204 is performed so that a plurality of data map pairs are generated in order to characterize an entire environment under a range of camera settings and environment conditions, wherein the range may be predetermined (e.g., by an AI engineer). For example, the operation 204 may be performed so as to generate data pairs that cover an entire game world environment from a plurality of angles, lighting conditions and states. Similarly, operation 204 may be performed for a range of object animation states such that data maps are generated that describe the object animation from a plurality of angles and during a plurality of animation states.

Figure 3:
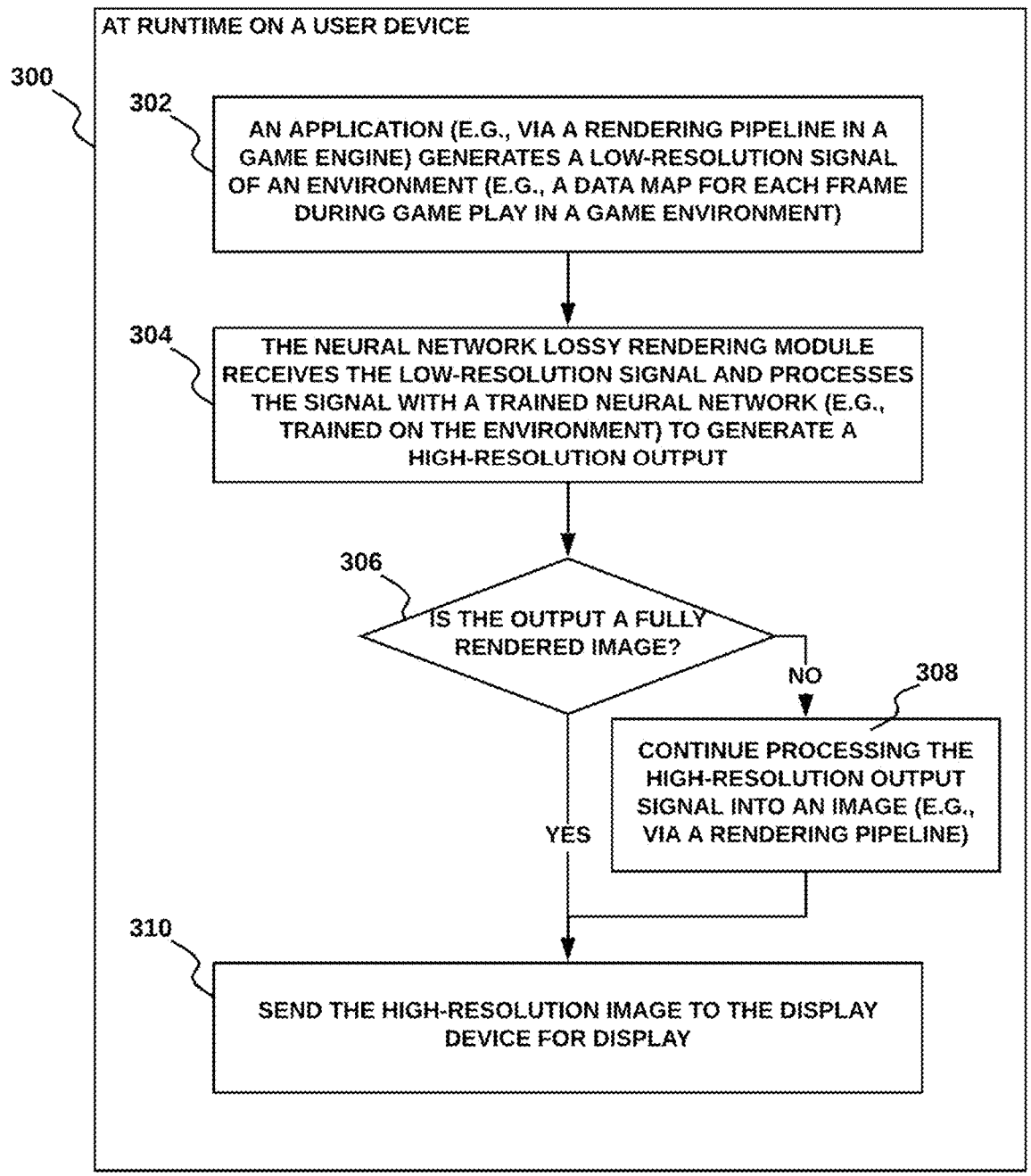
FIG. 3 is a schematic illustrating a method for operating a neural network lossy rendering system, in accordance with one embodiment.

In accordance with an embodiment, and shown in FIG. 3 is a method 300 for generating high-resolution images during an execution of an application 114 (e.g., at runtime) on a user device 102. During the method 300, the application may be executing on the device 102 (e.g., the CPU 103 may be retrieving instructions from the application 114 stored in the memory 101, and executing such instructions). In accordance with an embodiment, the execution of the application 114 includes a generation of an environment such as a game world, a game level, or the like. For example, the application 114 may generate a game world for a user 130 to interact with (e.g., to play). In accordance with an embodiment, at operation 302 of the method 300, the application 114 generates (e.g., via the game engine 104) a low-resolution signal for a frame or series of frames. The low-resolution signal represents at least a part of an output from the application 114 (e.g., part of a series of frames representing game play within the environment) that is to be displayed on the display device 109. The low-resolution signal may be generated by a rendering pipeline (e.g., within the game engine). The low-resolution signal may be a series of low-resolution image frames (e.g., RGB video game frames) generated by the rendering pipeline. In accordance with an embodiment, the low-resolution signal may also be low-resolution data generated by a process within a rendering pipeline (e.g., generated within an intermediate step within the pipeline). For example, the low-resolution signal may include reflectivity data generated at a point within a rendering pipeline process, and which must be further processed within the pipeline to generate a displayable image. As part of operation 302 of the method 300, the game engine 104 sends the low-resolution signal to the neural network lossy rendering module 116.

In accordance with an embodiment, at operation 304 of the method 300, the neural network lossy rendering module 116 receives the low-resolution signal and processes the signal to generate a high-resolution output. The processing including providing the signal as input to a trained neural network and producing an output from the trained neural network. The trained neural network being a network that has been trained within the environment using the method 200 described with respect to FIG. 2A and FIG. 2B.

In accordance with an embodiment, at operation 306 of the method 300, the neural network lossy rendering module 116 determines whether the high-resolution output generated during operation 304 is a fully rendered image (e.g., an RGB image which can be displayed directly within a display device 109).

In accordance with an embodiment, at operation 308, based on the high-resolution output requiring further rendering (e.g., based on it not being a fully rendered image), the high-resolution output signal is further processed (e.g., within a rendering pipeline) to generate a final image (e.g., a displayable RGB image). For example, operation 304 may generate a high-resolution reflection map for a frame, which would then be used during operation 308 (along with other data from the application) to generate a high-resolution RGB image with accurate reflections. The motivation for generating a reflection map at operation 304 is that accurately mapping reflections in an environment at runtime (e.g., during game play) is very computationally expensive.

In accordance with an embodiment, at operation 310 of the method 300, based on the high-resolution output being a fully rendered image that does not require further rendering (e.g., an RGB image ready for display), the image is sent to the display device 109 for display.

In accordance with an embodiment, during operation of the method 300, the game engine may be used to produce the low-resolution signal at every frame generated by the application 114 (e.g., which is a task that can be done quickly even on low quality device hardware, and that may be independent of an amount of 3D mesh triangles used within the frame). The method 300 described with respect to FIG. 3 can be carried out in real-time with low quality mobile device hardware (e.g., hardware with low processing power).

Figure 4:
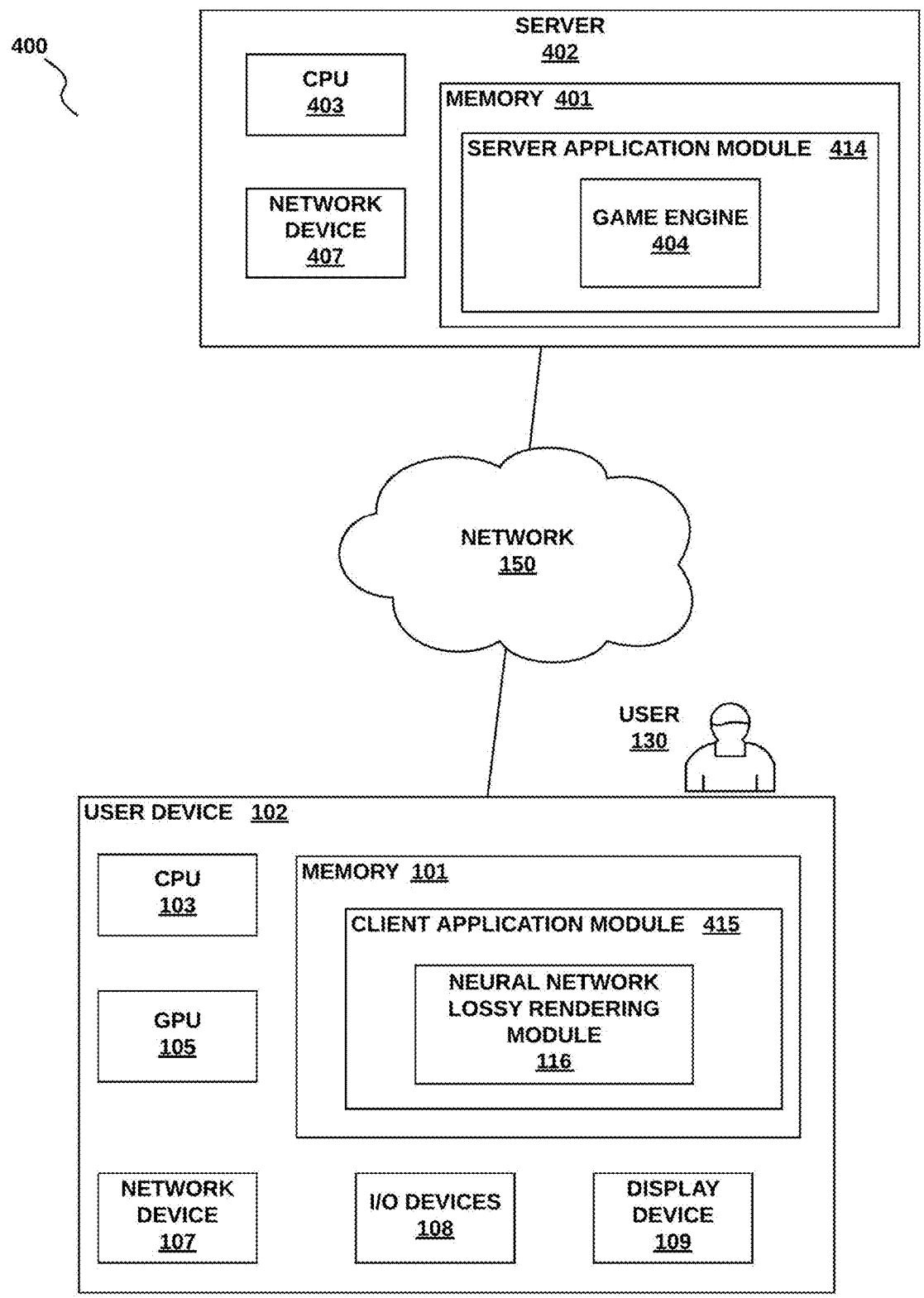
FIG. 4 is a schematic illustrating a neural network lossy rendering system that includes a network, in accordance with one embodiment.

In accordance with an embodiment, and shown in FIG. 4 is a neural network lossy rendering system 400 which is similar to the neural network lossy rendering system 100 shown in FIG. 1. The neural network lossy rendering system 400 in FIG. 4 includes a server device 402 in networked communication with the user device 102 via a network 150 (e.g., a cellular network, a Wi-Fi network, the Internet, and so forth). In accordance with an embodiment, the server device 402 includes one or more central processing units 403 (CPUs). The CPU 403 is any type of processor, processor assembly comprising multiple processing elements (not shown), having access to a memory 401 to retrieve instructions stored thereon, and execute such instructions. Upon execution of such instructions, the instructions implement the server device 402 to perform a series of tasks as described herein (e.g., as described with respect to FIG. 2A, FIG. 2B, and FIG. 5). The memory 401 can be any type of memory device, such as random access memory, read only or rewritable memory, internal processor caches, and the like. The server device 402 also includes one or more networking devices 407 (e.g., wired or wireless network adapters) for communicating across the network 150.

The memory 401 in the server device 402 can be configured to store a server application 414 which can include a game engine 404. The game engine 404 may be similar to the game engine 104 and the server application 414 may be similar to the application 114 described with respect to FIG. 1. The game engine 404 includes computer-executable instructions residing in the memory 401 that are executed by the CPU 403 during operation.

In accordance with an embodiment, the user device 102 shown in FIG. 4 is similar to the user device 102 shown in FIG. 1. The memory 101 may include a client application module 415 which includes the neural network lossy rendering module 116. The client application module 415 may be similar to the application 114. Each of the client application 415, and the neural network lossy renderer 116 includes computer-executable instructions residing in the memory 101 that are executed by the CPU 103 and optionally with the GPU 105 during operation.

Figure 5:
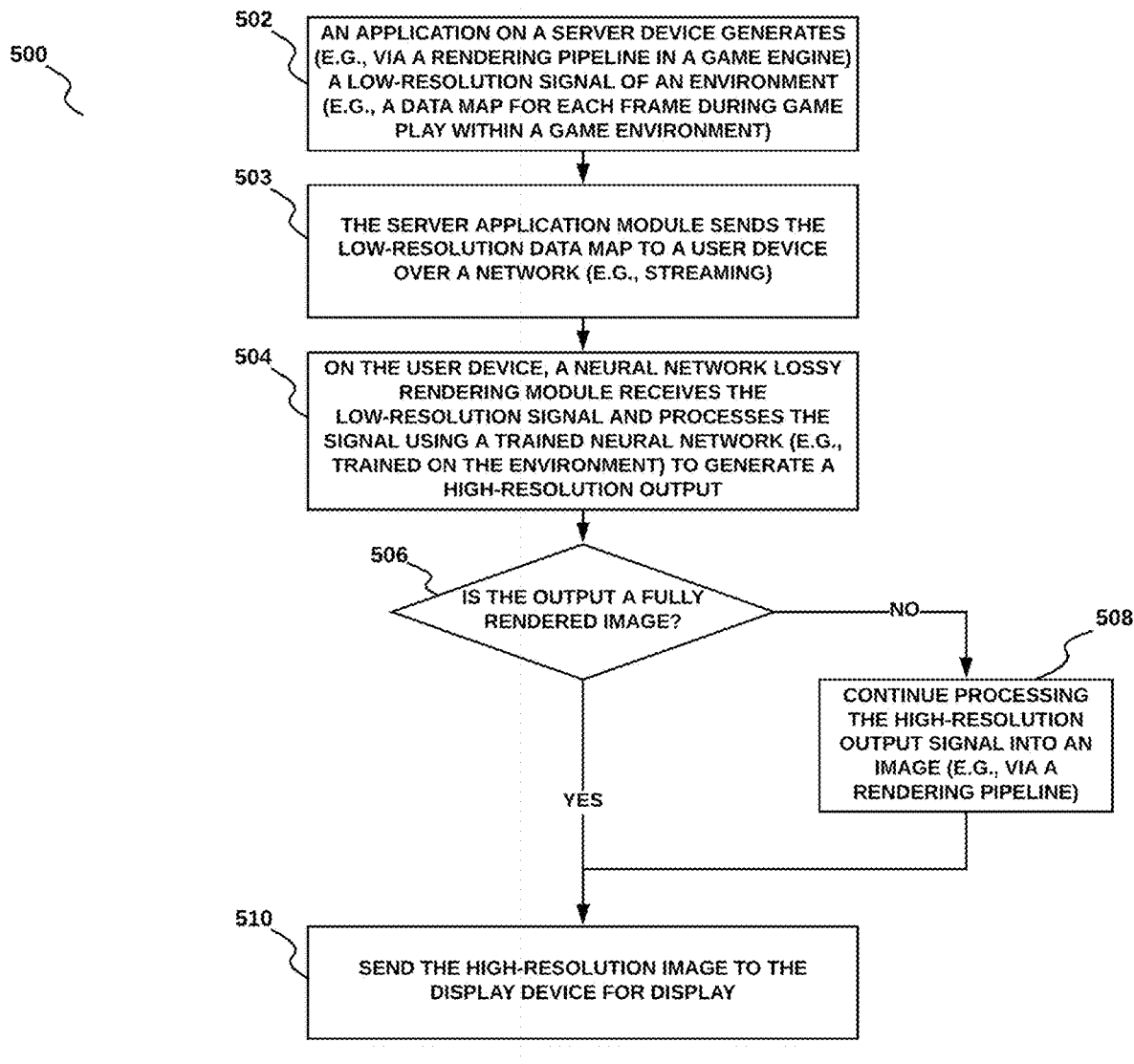
FIG. 5 is a schematic illustrating a method for operating a neural network lossy rendering system that includes a network, in accordance with one embodiment.

In accordance with an embodiment, and shown in FIG. 5 is a method 500 for generating high-resolution images on a user device 102 during the execution of an application 415 (e.g., at runtime) while receiving a low-resolution signal over a network 150 from a server device 402. During the method 500, the server application 414 is executing on the server device 402 (e.g., the CPU 403 retrieving instructions from the application 414 stored in the memory 401, and executing such instructions). In accordance with an embodiment, at operation 502 of the method 500, the server application 414 (e.g., via the game engine 404) generates a low-resolution signal for a frame (e.g., whereby the frame is to be rendered on the device 102). The low-resolution signal represents at least a part of an output from the server application 414 (e.g., part of a game play) that is to be sent to the user device 102 and displayed on the display device 109. In accordance with an embodiment, operation 502 of the method 500 is similar to operation 302 of the method 300. The low-resolution signal may be generated by a rendering pipeline (e.g., within the game engine 404). The low-resolution signal may be a series of low-resolution image frames (e.g., RGB video game frames) generated by the rendering pipeline. In accordance with an embodiment, the low-resolution signal may also be low-resolution data generated by a process within a rendering pipeline (e.g., generated within an intermediate step within the pipeline). For example, the low-resolution signal may include reflectivity data generated at a point within a rendering pipeline process, and which must be further processed within the pipeline to generate a displayable image.

In accordance with an embodiment, at operation 503 of the method 500, the server application 414 sends the low-resolution signal over the network 150 to the neural network lossy rendering module 116 in the user device 102. In accordance with an embodiment, operation 503 may include streaming the low-resolution signal over the network 150. In accordance with an embodiment, at operation 504 of the method 500, the neural network lossy rendering module 116 receives the low-resolution signal and processes the signal to generate a high-resolution output. The processing including using the signal as input to a trained neural network and producing an output from the trained neural network. The neural network used in operation 504 is a neural network that has been trained using the method 200 described with respect to FIG. 2A and FIG. 2B. In accordance with an embodiment, the operation 504 of the method 500 is similar to the operation 304 of the method 300.

In accordance with an embodiment, at operation 506 of the method 500, the neural network lossy rendering module 116 determines whether the high-resolution output generated during operation 504 is a fully rendered image (e.g., an RGB image which can be displayed directly within a display device 109). In accordance with an embodiment, at operation 508, based on the high-resolution output requiring further rendering (e.g., based on it not being a fully rendered image), the high-resolution output is further processed (e.g., within a rendering pipeline) to generate an image (e.g., a displayable RGB image). In accordance with an embodiment, the operation 508 of the method 500 is similar to the operation 308 of the method 300. In accordance with an embodiment, at operation 510 of the method 500, based on the high-resolution output being a fully rendered image that does not require further rendering (e.g., an RGB image ready for display), the image is sent to the display device 109 for display. In accordance with an embodiment, the operation 510 of the method 500 is similar to the operation 310 of the method 300. In accordance with an embodiment, during operation of the method 500, the game engine 404 may be used to produce the low-resolution signal at every frame and send that signal to the user device 102 over the network 150 (e.g., which is a task that does not require a large bandwidth). In accordance with an embodiment, the method 500 described with respect to FIG. 5 can be used to produce a game streaming system which is resistant to a drop-in transmission bandwidth over the network 150 due to a low transmission bandwidth requirement for the low-resolution signal.

Figure 6A:
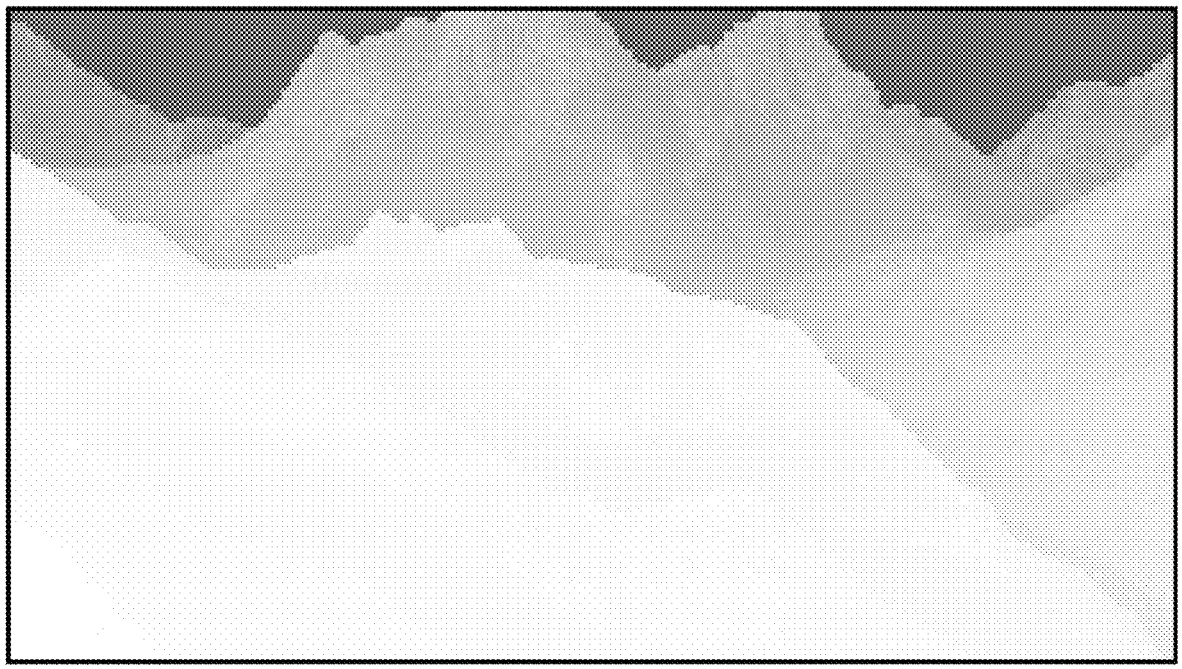
FIG. 6A is a schematic illustrating an example of a low-resolution data map for a neural network lossy rendering system, in accordance with one embodiment.

In accordance with an embodiment and shown in FIG. 6A is an example of a low-resolution data map displaying an outline of a series of mountains from within an environment. The low-resolution data map in the example shown in FIG.

6A is an image that only displays the outline of the mountains and includes very little detail of the terrain therein. The low-resolution data map in FIG. 6A may be used as part of the low-resolution signal input in operation 304 of the method 300 (e.g., or in operation 504 of the method 500).

Figure 6B:
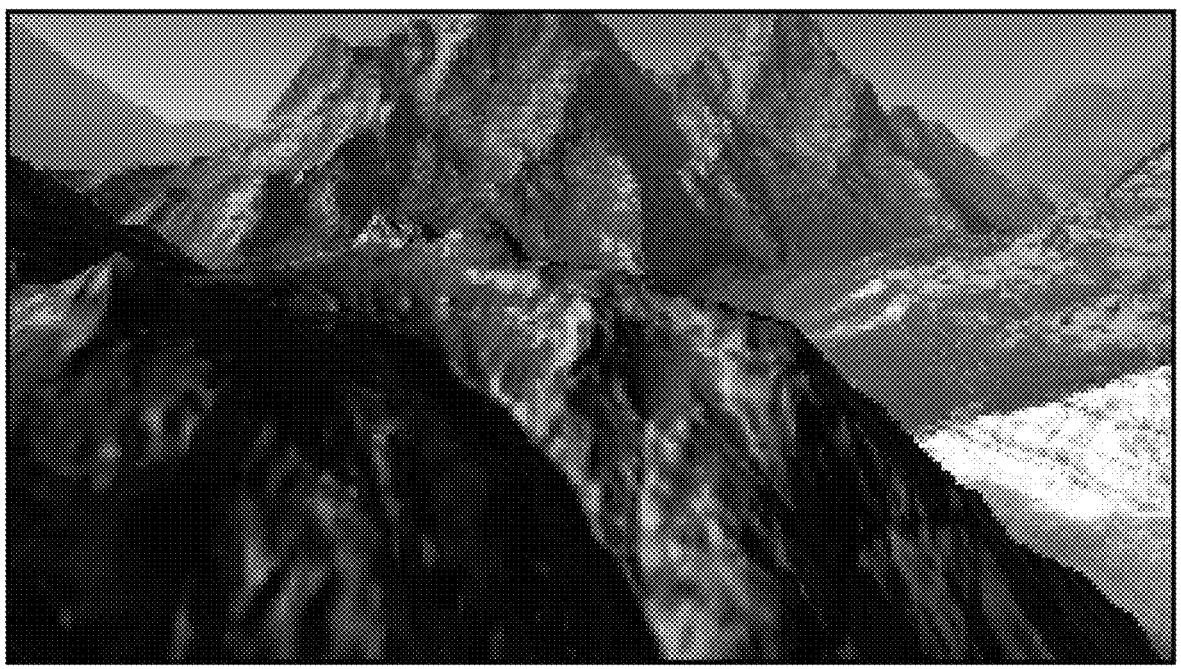
FIG. 6B is a schematic illustrating an example of a high-resolution data map for a neural network lossy rendering system, in accordance with one embodiment.

In accordance with an embodiment and shown in FIG. 6B is an example of a high-resolution data map generated by the neural network lossy renderer system 100 at operation 304 (e.g., or at operation 504) when the low-resolution data map from FIG. 6A is used as an input to the operation. As seen in FIG. 6B, the neural network lossy renderer system 100 generates details of the terrain including terrain shape, lighting, shading, color (e.g., not shown in FIG. 6B).

It will be apparent from the description herein that aspects of the present invention may be embodied, at least in part, in software. That is, said aspects may be carried out in a computer system or other data processing system in response to its processor executing sequences of instructions contained in a memory. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will understand that the functions result from execution of the code by a processor.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
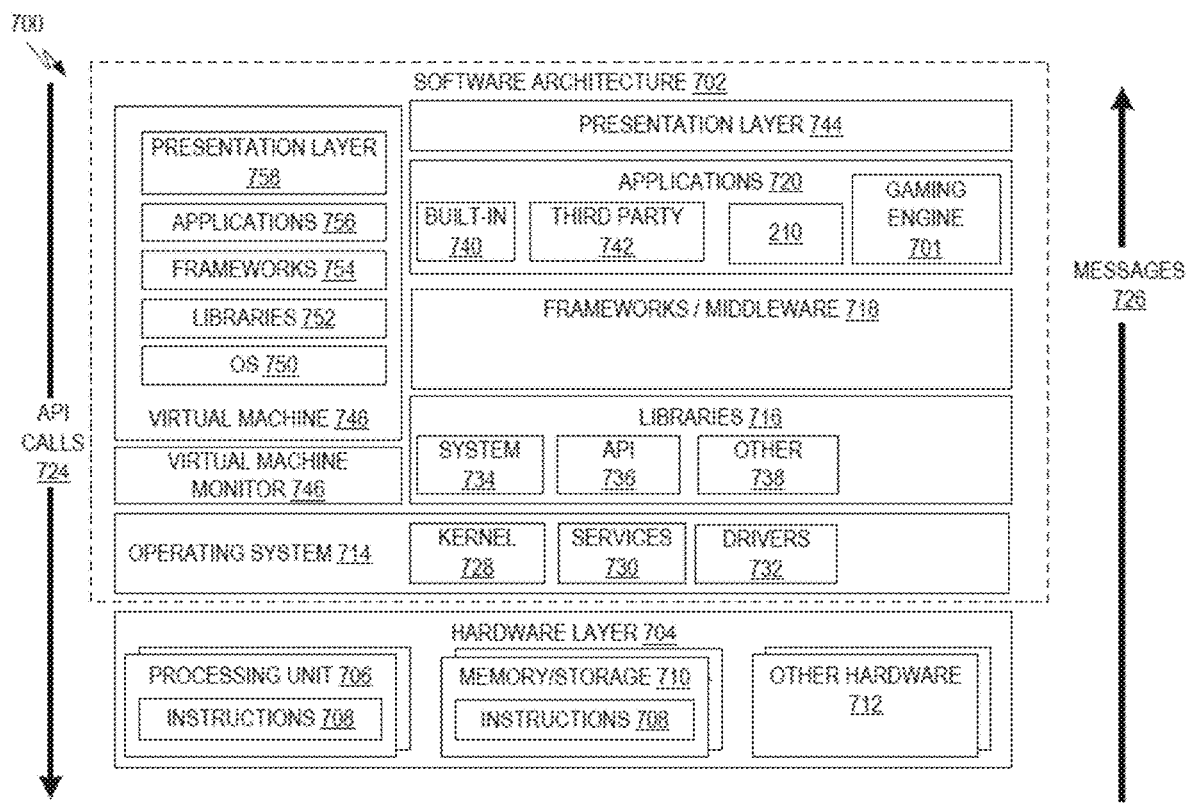
FIG. 7 is a block diagram illustrating an example software architecture, which may be used in conjunction with various hardware architectures described herein.

FIG. 7 is a block diagram 700 illustrating an example software architecture 702, which may be used in conjunction with various hardware architectures herein described to provide a gaming engine 701 and/or components of the neural network lossy rendering system 100. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 7, this is illustrated by a virtual machine 748. The virtual machine 748 creates a software environment where applications/modules can execute as if they were executing on a hardware machine (such as the machine 800 of FIG. 8, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
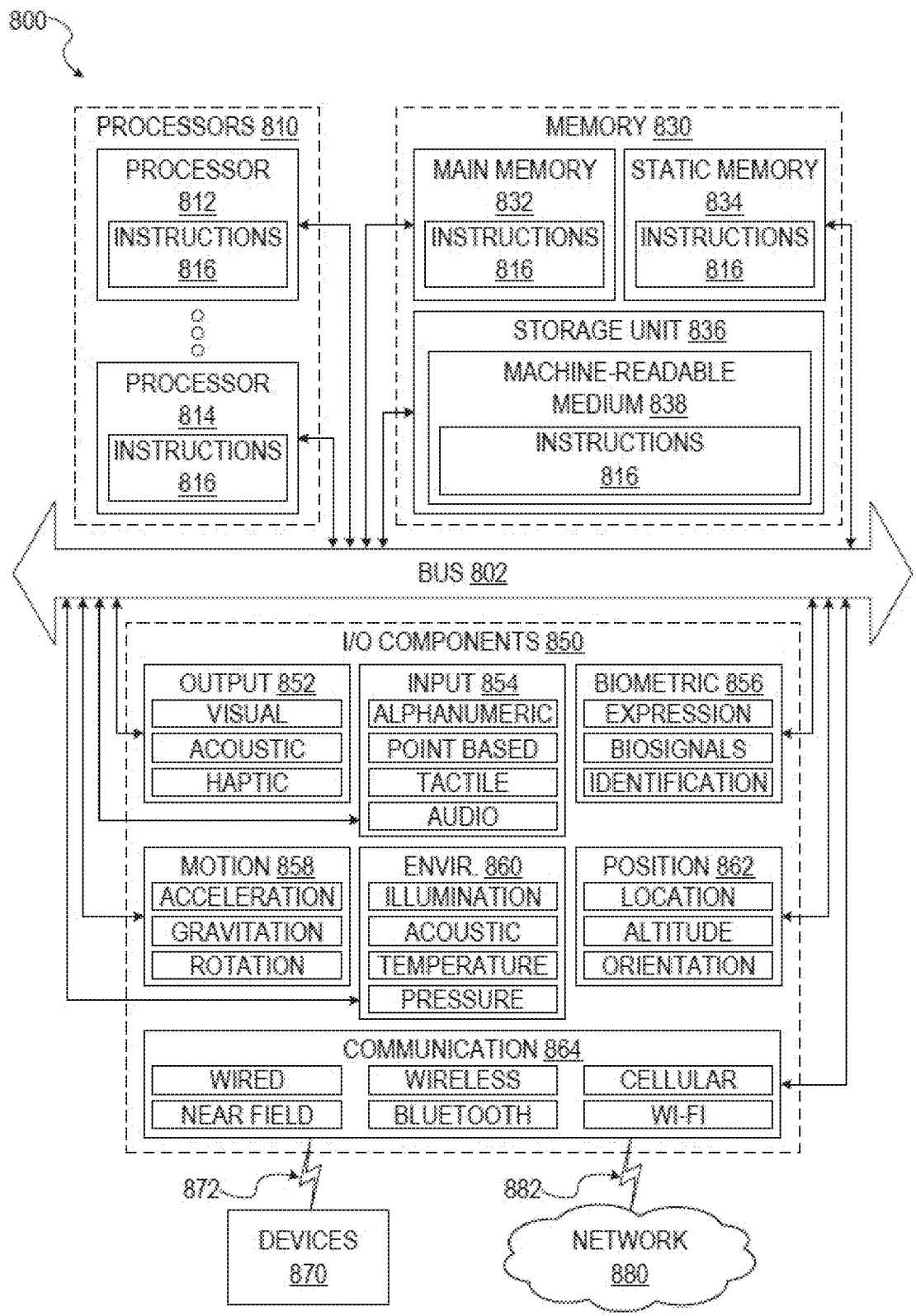
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 8. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
one or more computer processors;
one or more computer memories;
a hallucinator module incorporated into the one or more computer memories, the hallucinator module configured to perform operations for generating a high-resolution image frame for a state of a video game within a 2D or 3D environment, the operations comprising:
determining a low-resolution data map of a virtual camera frustum view of the 2D or 3D environment for the state, the data map being of a data type;
generating a high-resolution output data map of the data type from the low-resolution data map, the generating including training a neural network, the training including associating a low-resolution data map of the data type with a high-resolution data map of the data type within the 2D or 3D environment;
generating a high-resolution image of the frustum view from the high-resolution output data map; and
displaying the generated high-resolution image on a display device.

2. The system of claim 1, wherein determining the low-resolution data map includes the following operations:
receiving data describing the game state, the data including a set of camera properties describing the frustum view and a set of environment properties for the game state; and
rendering a low-resolution data map of the 2D or 3D environment from the frustum view using the set of camera properties and the set of environment properties.

3. The system of claim 1, wherein the training of the neural network further includes:
receiving data describing the 2D or 3D environment;
determining a range of camera properties of a virtual camera within the 2D or 3D environment;
determining a range of environment properties of the 2D or 3D environment;
rendering a pair of data maps of a type from a frustum view of the virtual camera within the 2D or 3D environment, a first data map of the pair being a low-resolution data map rendered with a set of camera properties from the range of camera properties and a set of environment properties from the range of environment properties, a second data map of the pair being a high-resolution data map rendered with the set of camera properties and the set of environment properties;
generating a plurality of pairs of data maps using a plurality of camera properties within the range of camera properties and a plurality of environment properties within the range of environment properties; and
training the trained neural network on the plurality of pairs of data maps using machine learning techniques to generate a high-resolution data map output of the type given a low-resolution data map input of the type.

4. The system of claim 3, wherein the range of camera properties includes one or more of the following:
a plurality of camera positions within the 2D or 3D environment;
a plurality of camera orientations; and
a plurality of camera settings for controlling a frustum view of the camera.

5. The system of claim 3, wherein the range of environment properties includes one or more of the following:
environment settings for lighting;
environment settings for object positioning and state for a plurality of objects within the environment; and
animation settings for a plurality of objects within the environment.

6. The system of claim 1, wherein the system includes:
a second device with one or more computer processors;
one or more computer memories;
a hallucinator client module incorporated into the one or more computer memories on the second device, the hallucinator client module configured to perform operations for generating a high-resolution image frame for a state of a video game, the operations comprising:
receiving the low-resolution output data map over a network;
generating a high-resolution output data map of the type associated with the low-resolution data map, the generating using a trained neural network for associating a low-resolution data map of the type with a high-resolution data map of the type;
generating a high-resolution image from the high-resolution output data map; and
displaying the image on a display device.

7. The system of claim 1, wherein a data map includes a 2D data set of the data type representing a rendering of the frustum view, and wherein the data type includes one or more of the following: RGB data, reflectivity data, surface normal data, depth data, and motion vector data.

8. A non-transitory computer-readable storage medium comprising a set of instructions that, when executed by one or more processors, causes the processors to perform operations for generating a high-resolution image frame for a state of a video game within a 2D or 3D environment, the operations comprising:
determining a low-resolution data map of a virtual camera frustum view of the 2D or 3D environment for the state, the data map being of a data type;
generating a high-resolution output data map of the data type from the low-resolution data map, the generating including training a neural network, the training including associating a low-resolution data map of the data type with a high-resolution data map of the data type within the 2D or 3D environment;
generating a high-resolution image of the frustum view from the high-resolution output data map; and
displaying the generated high-resolution image on a display device.

9. The non-transitory computer-readable storage medium of claim 8, wherein determining the low-resolution data map includes the following operations:
receiving data describing the game state, the data including a set of camera properties describing the frustum view and a set of environment properties for the game state; and
rendering a low-resolution data map of the 2D or 3D environment from the frustum view using the set of camera properties and the set of environment properties.

10. The non-transitory computer-readable storage medium of claim 8, wherein the training of the neural network further includes:
receiving data describing the 2D or 3D environment;
determining a range of camera properties of a virtual camera within the 2D or 3D environment;

determining a range of environment properties of the 2D or 3D environment;

rendering a pair of data maps of a type from a frustum view of the virtual camera within the 2D or 3D environment, a first data map of the pair being a low-resolution data map rendered with a set of camera properties from the range of camera properties and a set of environment properties from the range of environment properties, a second data map of the pair being a high-resolution data map rendered with the set of camera properties and the set of environment properties;

generating a plurality of pairs of data maps using a plurality of camera properties within the range of camera properties and a plurality of environment properties within the range of environment properties; and training the trained neural network on the plurality of pairs of data maps using machine learning techniques to generate a high-resolution data map output of the type given a low-resolution data map input of the type.

11. The non-transitory computer-readable storage medium of claim 10, wherein the range of camera properties includes one or more of the following:
a plurality of camera positions within the 2D or 3D environment;
a plurality of camera orientations; and
a plurality of camera settings for controlling a frustum view of the camera.

12. The non-transitory computer-readable storage medium of claim 10, wherein the range of environment properties includes one or more of the following:
environment settings for lighting;
environment settings for object positioning and state for a plurality of objects within the environment; and
animation settings for a plurality of objects within the environment.

13. The non-transitory computer-readable storage medium of claim 8, wherein the system includes:
a second device with one or more computer processors;
one or more computer memories;
a hallucinator client module incorporated into the one or more computer memories on the second device, the hallucinator client module configured to perform operations for generating a high-resolution image frame for a state of a video game, the operations comprising:
receiving the low-resolution output data map over a network;
generating a high-resolution output data map of the type associated with the low-resolution data map, the generating using a trained neural network for associating a low-resolution data map of the type with a high-resolution data map of the type;
generating a high-resolution image from the high-resolution output data map; and
displaying the image on a display device.

14. The non-transitory computer-readable storage medium of claim 8, wherein a data map includes a 2D data set of the data type representing a rendering of the frustum view, and wherein the data type includes one or more of the following: RGB data, reflectivity data, surface normal data, depth data, and motion vector data.

15. A method comprising:
performing, using one or more computer processors, operations for generating a high-resolution image frame for a state of a video game within a 2D or 3D environment, the operations comprising:

determining a low-resolution data map of a virtual camera frustum view of the 2D or 3D environment for the state, the data map being of a data type;

generating a high-resolution output data map of the data type from the low-resolution data map, the generating including training a neural network, the training including associating a low-resolution data map of the data type with a high-resolution data map of the data type within the 2D or 3D environment;

generating a high-resolution image of the frustum view from the high-resolution output data map; and displaying the generated high-resolution image on a display device.

16. The method of claim 15, wherein determining the low-resolution data map includes the following operations:
receiving data describing the game state, the data including a set of camera properties describing the frustum view and a set of environment properties for the game state; and
rendering a low-resolution data map of the 2D or 3D environment from the frustum view using the set of camera properties and the set of environment properties.

17. The method of claim 15, wherein the training of the neural network further includes:
receiving data describing the 2D or 3D environment;
determining a range of camera properties of a virtual camera within the 2D or 3D environment;
determining a range of environment properties of the 2D or 3D environment;
rendering a pair of data maps of a type from a frustum view of the virtual camera within the 2D or 3D environment, a first data map of the pair being a low-resolution data map rendered with a set of camera properties from the range of camera properties and a set of environment properties from the range of environment properties, a second data map of the pair being a high-resolution data map rendered with the set of camera properties and the set of environment properties;
generating a plurality of pairs of data maps using a plurality of camera properties within the range of camera properties and a plurality of environment properties within the range of environment properties; and
training the trained neural network on the plurality of pairs of data maps using machine learning techniques to generate a high-resolution data map output of the type given a low-resolution data map input of the type.

18. The method of claim 17, wherein the range of camera properties includes one or more of the following:
a plurality of camera positions within the 2D or 3D environment;
a plurality of camera orientations; and
a plurality of camera settings for controlling a frustum view of the camera.

19. The method of claim 17, wherein the range of environment properties includes one or more of the following:
environment settings for lighting;
environment settings for object positioning and state for a plurality of objects within the environment; and
animation settings for a plurality of objects within the environment.

20. The method of claim 15, wherein the system includes:
a second device with one or more computer processors;
one or more computer memories;
a hallucinator client module incorporated into the one or more computer memories on the second device, the hallucinator client module configured to perform operations for generating a high-resolution image frame for a state of a video game, the operations comprising:

receiving the low-resolution output data map over a network;

generating a high-resolution output data map of the type associated with the low-resolution data map, the generating using a trained neural network for associating a low-resolution data map of the type with a high-resolution data map of the type;

generating a high-resolution image from the high-resolution output data map; and displaying the image on a display device.

* * * * *